Figure 1:
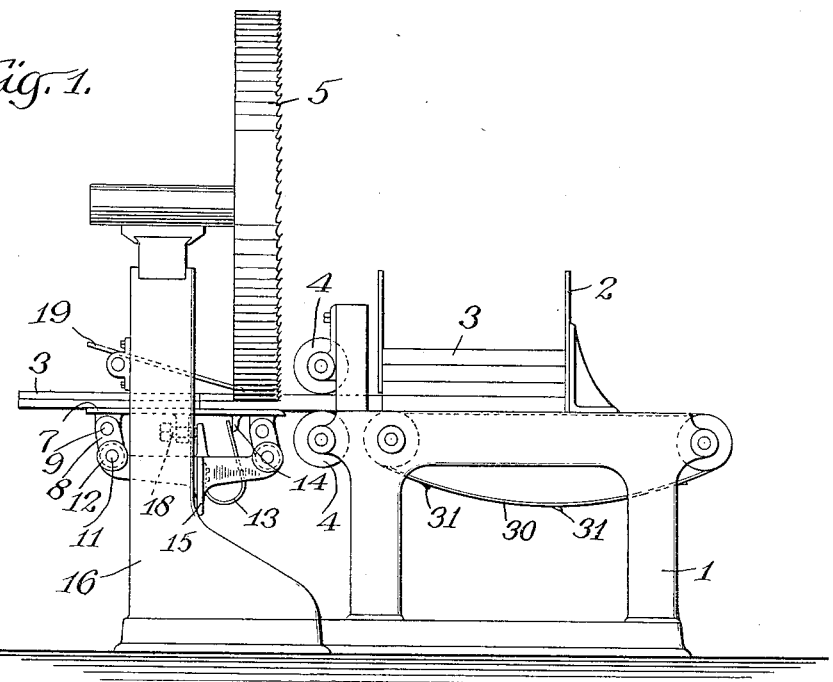

E. C. MERSHON.
BAND SAW MACHINE.
APPLICATION FILED JAN. 14, 1913.

1,112,822.

Patented Oct. 6, 1914.
2 SHEETS—SHEET 1.

WITNESSES
F. B. Townsend
A. M. McMahon

INVENTOR
Edward C. Mershon
BY
Townsend & Decker
ATTORNEY

E. C. MERSHON.
BAND SAW MACHINE.
APPLICATION FILED JAN. 14, 1913.

1,112,822.

Patented Oct. 6, 1914.
2 SHEETS—SHEET 2.

WITNESSES
F. B. Townsend
A. M. McMahon

INVENTOR
Edward C. Mershon.
BY
Townsend Secker
ATTORNEY

UNITED STATES PATENT OFFICE.

EDWARD C. MERSHON, OF SAGINAW, MICHIGAN, ASSIGNOR TO WILLIAM B. MERSHON & COMPANY, OF SAGINAW, MICHIGAN, A CORPORATION OF MICHIGAN.

BAND-SAW MACHINE.

1,112,822.  Specification of Letters Patent.  Patented Oct. 6, 1914.

Application filed January 14, 1913. Serial No. 741,912.

*To all whom it may concern:*

Be it known that I, EDWARD C. MERSHON, a citizen of the United States, and a resident of Saginaw, in the State of Michigan, have invented certain new and useful Improvements in Band - Saw Machines, of which the following is a specification.

My invention relates particularly to band sawing machines, both vertical and horizontal, in which the material to be sawn is fed to the saw by power and means provided for feeding the material to the saw in a direction as nearly parallel to the sides thereof as feasible. In machines of this general type in addition to the two or more feed rolls employed for feeding the stock forward to the saw-blade it is usual to employ on one side of the saw a fixed gage plate or platen opposite the breast of the saw in order to insure a uniform width of cut and to permit the width of cut to be adjusted, while upon the opposite side of the saw presser feet or rolls, pressing against the yielding sides of the board or stock keep the same engaged with said rigid or fixed gage plate or platen and thus insure uniformity in the width or thickness of cut. In the horizontal type of machine the table or bed immediately beneath the saw and upon which the stock rests may constitute the gage plate or platen and in the vertical type of machine the part known as the fence and located opposite the breast of the saw constitutes the gage plate or platen which determines the width of cut, the material being pressed against said rigid fence by suitable presser devices acting on the yielding side of the board or stock. Said gage plate or platen in both types of machine is ordinarily adjustable to and from the breast of the saw to vary the width of cut, but after adjustment, is fixed or clamped rigidly in its gaging position at a fixed distance from the saw, which distance is rigidly maintained during the operation of sawing stock into the desired widths or thickness.

My invention relates to certain improvements in the construction or manner of mounting of said portion of the machine and will be described as applied to the table, bed or platen which in the horizontal type of machine operates as the gage plate or platen.

The object of my present invention is to avoid any obstruction to the normal operation of the machine due to the lodgment of knots, slivers or other foreign material against said gage plate.

My invention consists substantially in mounting said gage plate or platen upon suitable supports which will permit it to yield under the action of the stock when such foreign material engages the said gage and in a direction away from the plane of the saw-blade, suitable means being provided to hold said gage plate firmly in its gaging position as for instance a stiff spring which may be so applied to the apparatus as to force the gage plate or platen against a suitable stop which may be adjusted to gage the width or thickness of cut.

In the preferred manner of carrying out my invention the devices which carry the gage plate or platen are properly constructed to likewise permit the platen to yield slightly in the direction of the feed of the stock and of the line of movement of the obstruction or foreign material. Furthermore, I prefer to construct the devices upon which the platen is mounted in such manner as to preserve the parallelism of the guide face of the platen to the face of the saw when said platen is caused to yield.

From the following description and drawings setting forth the invention as applied to that form of band-sawing machine known in the art as a horizontal band resaw, the manner of application to other forms of band-saw machines, as for instance the vertical band-saw type, employing a fence, will be obvious to those skilled in the art.

Figure 2:
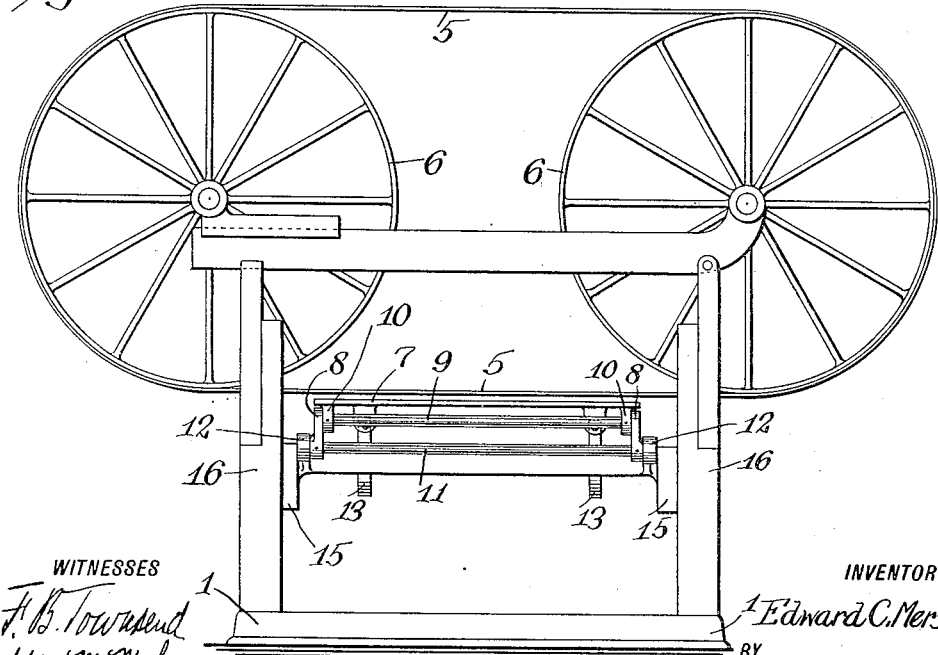
Figure 3:
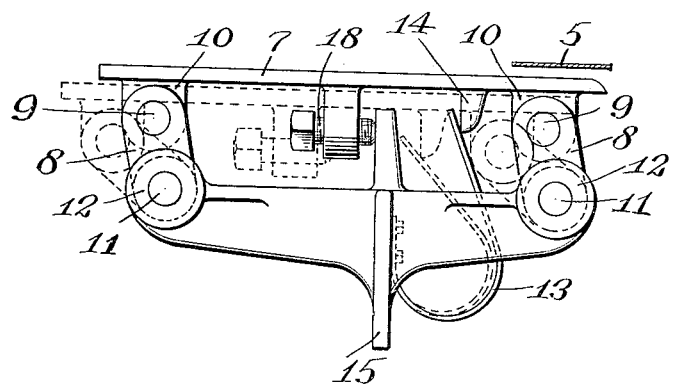
Figure 4:
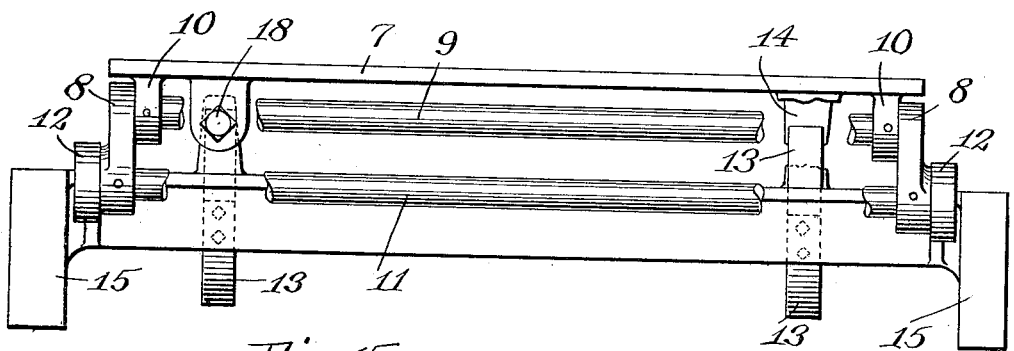
Figure 5:
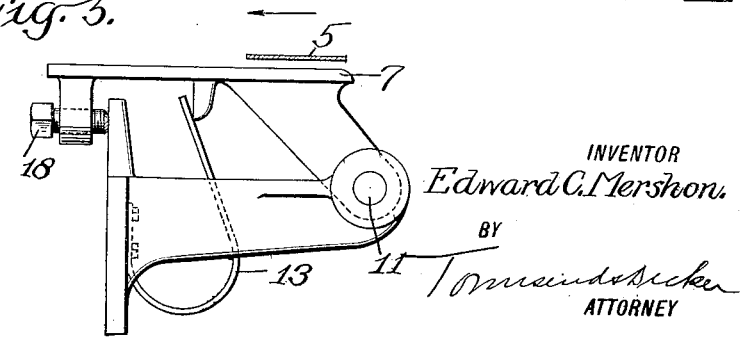

In the accompanying drawings, Figure 1 is a general side elevation of the portion of a horizontal band resaw in which my invention is embodied. Fig. 2 is an end elevation of the same, taken from the end in which the gage plate or platen is mounted. Fig. 3 is an enlarged view of the gage plate or platen showing one of the ways in which it may be mounted to accomplish the purposes of my invention and likewise illustrating the relation of the same to the saw blade. Fig. 4 is an end elevation of the parts shown in Fig. 3, the saw blade being omitted. Fig. 5 shows a modification in the manner of mounting the guide.

1 is the frame of the machine and 2 is a suitable hopper mounted on the same and adapted to hold short box shooks or other pieces of boards 3 to be fed in succession to the saw of the machine. For feeding these pieces, I may employ feeding devices of any suitable character, but for purposes of illustration only, have shown the feed as being accomplished by chains 30 having lugs or dogs 31 so spaced as to engage the rear end of the board (or boards) and feed it forward from the hopper at such time as the preceding board (or boards) has passed from beneath the forward wall of the hopper. Obviously, however, any of the usual methods of feeding by power driven feed rolls, chains, or reciprocating plungers or dogs might be employed.

4, 4 are the usual pressure rolls through which the stock feeds and by which it is caused to be properly presented to the edge of the saw 5. The usual band saw wheels are shown at 6 but the crowding wheels usually employed for guiding and maintaining the acting portion of the saw in proper position are not illustrated.

7 indicates the gage plate or platen which receives the stock after it leaves the rolls 4 and which has its face arranged substantially parallel with and opposite the face or breast of the saw and which is usually held rigidly at a fixed distance from the saw so as to firmly hold the stock which is being sawn in proper position with relation thereto, and thereby secure a cut of uniform width or thickness.

19 indicates any suitable pressure bar or other device carrying a presser foot or similar device acting upon the yielding side of the stock and operating to hold the stock constantly against the gage plate or platen as well known in the art.

In the operation of sawing machines of the general character so far described it quite frequently happens that in sawing defective lumber a knot or sliver is loosened from the board, especially as said knot or sliver comes in contact with the saw teeth and so drops downward and wedges itself between the pressure or guide rolls 4 and the front of the gage plate or platen and as this plate or platen is usually rigidly fixed in position, this results either in the board in which the knot is lodged or in the succeeding board being formed up out of its true path and binding and heating the saw, not only spoiling the piece of material which is being sawn, but stretching the saw and perhaps even breaking it. To overcome this difficulty, I so mount the plate or platen that when any obstruction, such for instance as just described, occurs, the feeding forward of the material causes the plate to be pushed away from its normal position and it is caused to assume a position substantially as indicated by the dotted lines in the Fig. 3. To accomplish this the plate or platen is mounted on suitable yieldable or movable supports, said plate or platen being normally held firmly to its true or normal gaging position by a spring or springs or other device operating on said support with a power superior to the opposing power of the presser devices to force and hold it or a part carried by it normally against a rigid abutment or stop which, in the particular form of apparatus shown in the drawings, is engaged by a screw 18 moving with and carried by the platen itself. Said screw being adjustable, serves to gage the width or thickness of cut according to its position. A construction of supporting devices which may be employed for this purpose and which maintains the parallelism of the guiding and gaging face of the platen with the face of the saw or with the line of feed of the material in all positions of the platen comprises parallel motion links 8, in which turns at their upper ends a bar 9 carrying, by means of brackets 10 or otherwise, the platen 7. At their lower ends the said links are fastened or secured properly to a horizontal rock shaft 11 turning in suitable bearings 12. Springs 13 of any suitable form are fastened at one end to the frame of the machine and at their free ends engage projections 14 depending from the platen as shown in Figs. 3 and 4. The bearings 12 which carry the shaft 11 are mounted on a proper frame or bracket 15 fastened to the post 16 or otherwise suitably supported. The springs 13 hold the platen normally in the position shown in full lines, which is the position for normal operation. When the knot, sliver or other obstruction engages the gage platen, the force exerted by feeding the material forward moves the gage platen both in the direction of the line of feed and in a direction away from the saw, the links 8 swinging and the shafts 9 and 11 turning at such time in their bearings, one set of which is in the upper end of the links and the other upon the bracket or frame 15. Such a yielding movement being a movement of the portion encountered by the obstruction in the direction of the feed of the work, as well as a motion of the gage platen or table away from the saw to allow space for the passage of the obstruction or other foreign material, the result is that in case of accident or obstruction of the feeding mechanism as above described, or in case of the saw being diverted from its true course, the gage plate yields and the material is fed on in a horizontal line in a direction parallel with the plane of the saw.

My improved construction of support for the gage plate, table or platen also permits clearing away all of the slivers, strands of stringy sawdust and other extraneous matter which might tend to clog and interfere with the proper working of the saw blade or the feeding mechanism or the general operation of the machine. The set screw 18 acts as a stop to limit the upward movement of the gage plate or table under the action of the spring, or other device, so that normally it may be held firmly at a constant distance from the saw by the springs in its position of greatest elevation which is determined by the adjustment of the screw, the springs yielding under abnormal condition to permit yielding of the platen or table as already described. The set screw serves likewise as a means of adjusting the platen so that the guiding face may occupy the proper plane to properly guide the material in relation to the saw as well as to gage or determine the width or thickness of cut. Obviously, substantially the same result could be obtained by mounting the gage plate or platen upon one pivotal shaft 11, as indicated in Fig. 5, so that the platen would swing as a whole in the arc of a circle, of which the axis of the rock shaft is the center. In this case it will be desirable to locate the pivot or shaft 11 to the right of or somewhat in advance of the forward corner or edge of the gage plate or platen as shown. With the construction shown in this figure, as with the construction previously described, the forward corner or edge of the gage plate or platen, which is substantially abreast with the teeth of the saw, will yield toward the left when engaged by the obstruction or foreign matter and will be forced away from the saw. Inasmuch as, however, the part swings with the rock shaft acting as a pivot, the yielding movement will be accompanied by a change of position of the guide face of the platen with relation to the plane of the saw, but this will not affect substantially the operation.

Obviously, my invention is not limited to any particular construction of feeding mechanism or manner of mounting the band saw or other devices. It is likewise apparent that the manner of and the devices for yieldably mounting the gage plate or platen might be otherwise varied without departing from the invention.

What I claim as my invention is:

1. In a band-saw machine, the combination with the saw, of a gage plate or platen normally maintained in gaging position abreast the saw, and means on the opposite side of the saw for holding the stock against said gage plate, said gage plate being yieldable in a direction away from the saw as and for the purpose described.

2. In a band-saw machine, the combination with the saw, of a gage plate or platen having its guide face arranged opposite the breast of the saw, yielding means for holding said gage plate during normal operation in adjusted position for the desired width or thickness of cut and means operating on the stock at the opposite side of the saw to keep the stock engaged with said gage plate.

3. The combination with a band-saw, of an automatically yielding gage plate or platen having a guide face arranged opposite the breast of the saw-blade, a stop limiting the movement of the gage plate or platen toward the saw and adjustable to vary the width of cut and means for preserving the parallelism of the guide face and saw-blade in the various positions of adjustment of the gage plate or platen as and for the purpose described.

4. The combination with a band-saw, of a gage plate or platen having a guide face substantially parallel to and opposite the breast of the saw, yielding means acting on the gage plate to firmly hold the same in gaging position, a fixed stop or abutment limiting the movement of the guide plate or platen toward the saw and serving to determine the width or thickness of cut while allowing free movement of the guide plate or platen away from the saw under abnormal conditions as and for the purpose described.

5. The combination with a band saw, of a gage plate or platen mounted to be movable toward and away from the saw-blade opposite the breast thereof, a stop limiting its movement toward the blade and so as to determine the width or thickness of cut, yielding means operating on the said gage plate or platen and serving to hold it normally in gaging position against the counteracting force of the presser devices, and parallel motion links connected to the gage plate or platen for preserving the parallelism of its guide face with the face of the saw in its various positions of adjustment.

6. The combination in a band-saw machine, of a gage plate or platen opposite the saw blade, parallel motion links connected to said plate, means tending to force the plate toward the blade and in the direction of the line of feed and an adjustable stop for limiting the movement of the plate toward the saw.

7. In a band-saw machine, the combination with a saw, of a gage plate or platen, yielding means for maintaining said plate or platen normally in gaging position during the operation of the apparatus and means for causing the plate, when it yields under abnormal conditions, to move in the direction of the feed and away from the saw-blade.

8. In a band-saw machine, the combination of a gage plate or platen arranged opposite the saw-blade, parallel motion devices carrying the same, yielding means for pressing the platen toward the saw-blade and holding it in fixed relation to the breast of the saw and an adjustable stop for determining the distance of the guide face of the platen from the plane of the saw-blade while held in gaging position.

Signed at Saginaw in the county of Saginaw and State of Michigan this 6th day of January, A. D. 1913.

EDWARD C. MERSHON

Witnesses:
A. A. EASTERLY,
JOHN N. RICHTER.

Copies of this patent may be obtained for five cents each, by addressing the "Commissioner of Patents, Washington, D. C."